(12) United States Patent
Buys et al.

(10) Patent No.: US 12,206,899 B2
(45) Date of Patent: Jan. 21, 2025

(54) METHOD AND APPARATUS FOR COMPRESSION AND DECOMPRESSION OF VIDEO DATA WITHOUT INTRAFRAME PREDICTION

(71) Applicant: ArKaos S.A., Waterloo (BE)

(72) Inventors: Koen Buys, Waterloo (BE); Benjamin Bauwens, Waterloo (BE); Daniel Jungmann, Waterloo (BE)

(73) Assignee: ArKaos S.A., Waterloo (BE)

( * ) Notice: Subject to any disclaimer, the term of this patent is extended or adjusted under 35 U.S.C. 154(b) by 5 days.

(21) Appl. No.: 17/953,927

(22) Filed: Sep. 27, 2022

(65) Prior Publication Data

US 2024/0015329 A1    Jan. 11, 2024

Related U.S. Application Data

(60) Provisional application No. 63/248,760, filed on Sep. 27, 2021.

(51) Int. Cl.
*H04N 19/124* (2014.01)
*H04N 19/176* (2014.01)
*H04N 19/186* (2014.01)
*H04N 19/625* (2014.01)
*H04N 19/91* (2014.01)

(52) U.S. Cl.
CPC ......... *H04N 19/625* (2014.11); *H04N 19/176* (2014.11); *H04N 19/186* (2014.11); *H04N 19/91* (2014.11)

(58) Field of Classification Search
CPC .. H04N 19/625; H04N 19/176; H04N 19/186; H04N 19/91
USPC ...................................... 375/240.18
See application file for complete search history.

(56) References Cited

U.S. PATENT DOCUMENTS

| | | | | |
|---|---|---|---|---|
| 11,523,136 B2* | 12/2022 | Hsiang | ............... | H04N 19/70 |
| 11,606,568 B1* | 3/2023 | Wang | ............... | H04N 19/18 |
| 2007/0036222 A1* | 2/2007 | Srinivasan | ........... | H04N 19/593 |
| | | | | 375/240.18 |
| 2013/0114730 A1* | 5/2013 | Joshi | ............... | H04N 19/156 |
| | | | | 375/240.18 |
| 2017/0150186 A1* | 5/2017 | Zhang | ............... | H04N 19/61 |
| 2019/0191164 A1* | 6/2019 | Han | ............... | H04N 19/82 |
| 2021/0385499 A1* | 12/2021 | Zhang | ............... | H04N 19/132 |

FOREIGN PATENT DOCUMENTS

WO      WO-2019045798 A1 *  3/2019  ........... H04N 19/124

* cited by examiner

*Primary Examiner* — Albert Kir
(74) *Attorney, Agent, or Firm* — ARENTFOX SCHIFF LLP

(57) ABSTRACT

A video compression/decompression method designed to carefully balance the amount of work done by the CPU and GPU processes only key image frames to allow fast seeking and backward playback. By using only uniform sized discrete cosine transformation blocks partial frame decoding can be achieved, without using intraframe prediction, enabling playback at increased speeds and skipping decoding of frames that are not displayed. The disclosed video codec may optionally support alpha channel data.

18 Claims, 10 Drawing Sheets

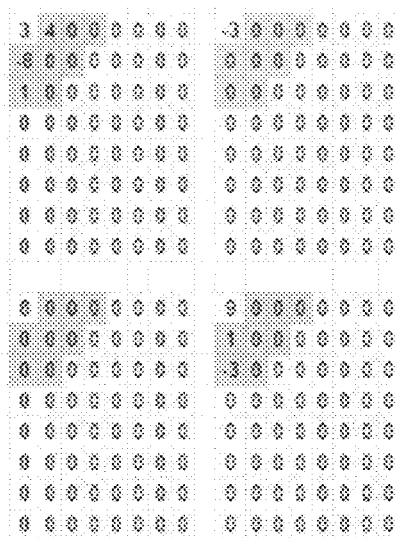

METHOD AND APPARATUS FOR COMPRESSION AND DECOMPRESSION OF VIDEO DATA WITHOUT INTRAFRAME PREDICTION

CROSS REFERENCE TO RELATED APPLICATIONS

This application claims the benefit of priority to U.S. Provisional Application No. 63/248,760, entitled "METHOD AND APPARATUS FOR COMPRESSION AND DECOMPRESSION OF VIDEO DATA WITHOUT INTRAFRAME PREDICTION", which was filed on Sep. 27, 2021. U.S. Provisional Application No. 63/248,760 is incorporated herein by reference.

FIELD OF THE DISCLOSURE

The disclosure relates to equipment and techniques for encoding and decoding of video data.

BACKGROUND OF THE DISCLOSURE

A codec is a processing protocol used to encode or decode a data stream or signal. Most video codecs are optimized for playback. Traditional movie codecs, such h264, h265/HEVC, VP9, VP10/AV1, use infra- and inter-frame prediction techniques that are optimized for minimal file size, requiring complex decoders and complex decoding logic. This makes such codecs expensive to decode on general purpose hardware like Central Processing Units (CPUs) and Graphics Processing Units (GPUs) on desktop computers and laptops. Such codecs also lack support for encoding an alpha channel.

There currently exists video codecs that are not for general purpose, but are used in the lighting industry, including ProRes commercially available from Apple, Inc., Cupertino, CA and HAP, commercially available from Vid-Vox, LLC, Troy, NY. ProRes was designed to be an intermediate codec for video editing and uses only key frames and supports alpha channel encoding, ProRes uses intra frame prediction and slices the frame to offer some parallel decoding of a single frame. HAP uses only key frames, supports alpha channel, and uses no prediction. HAP uses block compression (4×4 blocks) that is supported by desktop GPUs. This greatly limits the quality and compression ratio and requires special decompression hardware.

Accordingly, a need exists for a video codec there can be used by the lighting industry which does not utilize intraframe prediction.

A further need exists for video codec there can be used by the lighting industry which supports an alpha channel but still maintains quality compression ratios and does not require special decompression hardware.

BRIEF DESCRIPTION OF THE DRAWINGS

For a more complete understanding of the present disclosure and the advantages thereof, reference is now made to the following description taken in conjunction with the accompanying drawings in which like reference numerals indicate like features and wherein:

FIGS. 9A-B illustrate conceptually the transformation of a two-dimensional array of coefficient values into a binary stream in accordance with the disclosure.

SUMMARY OF THE DISCLOSURE

Figure 1:
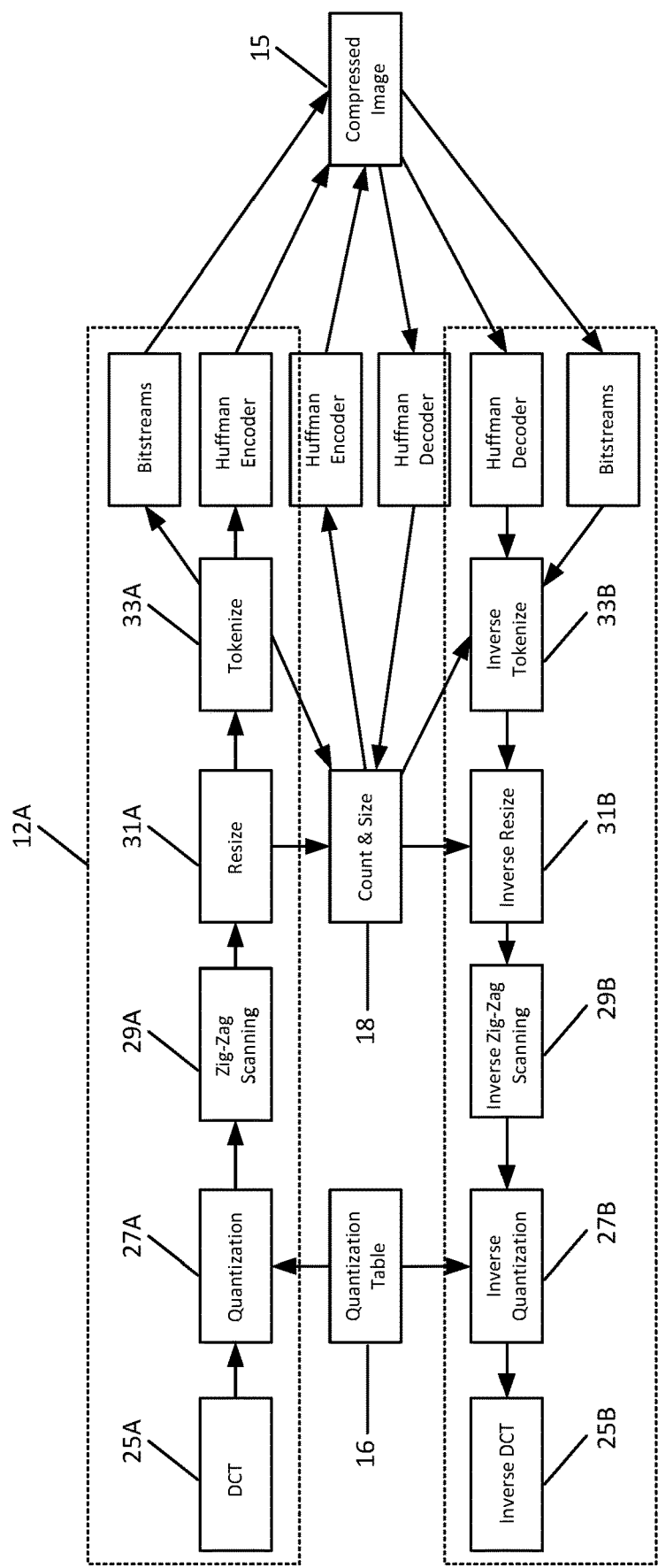
FIG. 1 illustrates conceptually a sequence of processing functions used to compress and decompress image data in accordance with the disclosure.

Disclosed is a video codec designed to run on existing hardware like CPUs with Single Instruction, Multiple Data (SIMD) processing capabilities and GPUs. The disclosed video codec is designed to carefully balance the amount of work that is done by the CPU and GPU. In embodiments, only key image frames are processed to allow fast seeking and backward playback. Specifically, use of only uniform sized discrete cosine transformation blocks allows partial frame decoding, without using intraframe prediction, in accordance with the disclosure. The disclosed video codec allows easy playback at increased speeds and skips decoding of frames that are not displayed. The disclosed video codec may optionally support an alpha channel.

In accordance with one aspect of the disclosure, a method for efficient compression of video data includes the following steps. First, frames of raw image data are converted to YCoCg(A) color space. The resulting color planes are divided into pixel groups of 16×16 pixels, each of which is further subdivided into pixel blocks, .e.g. 8×8 pixels identifiable as a two-dimensional array with indices from (0,0) to (7,7), Each pixel block is processed with a Discrete Cosine Transform (DCT), which expresses a finite sequence of data points in terms of a sum of cosine functions oscillating at different frequencies, and then quantized, resulting in a two-dimensional array of coefficients. The coefficient at index position (0,0) of each pixel block, referred to as the DC, is stored separately. The coefficients at the other 63 indices of the pixel block are referred to as the block AC. The multiple pixel blocks within a pixel group are scanned in zigzag order, skipping the AC coefficient value at index (0.0) of each pixel block, converting the two dimensional indices from (0,1) to (7,7) of each block into a one dimensional sequence array from 1 to 63.

The maximum index of all non-zero coefficient values in a pixel group is identified and converted to the Group Maximum Index (GMI) by taking the smallest value from the table [8, 16, 32, 64] that is equal or bigger than the maximum index. The one dimensional sequence array of each pixel block are then resized to match the size of the and all sequence arrays combined to form a single binary stream.

Next, the quantized coefficient values are transformed for encoding. First, the absolute value of each coefficient value is taken. Then the highest non-zero bit is calculated as the BT (bit count). The sign, the absolute value and the BT of each coefficient value are formed into bit streams. For the entropy encoding, a Huffman encoder is used. The BT and a skip value (a value identifying the next n bits are all zero) are Huffman encoded.

In embodiments, the compressed data resulting from the decompression methods described herein comprises eight bit streams, interleaved at the 32 bit boundaries, and count and size data describing the bit streams which has been to organized is Huffman encoded. The use of eight bit streams allows for eight way parallel decoding using SIMD hardware without needing support for gather instructions.

The decompression process entails reversing the decompression steps described above to regenerate the original image data, as further explained herein.

According to one aspect of the disclosure, a method of compressing image data comprises; A) converting image data into a plurality of color planes; B) dividing each plane into a plurality of pixel groups; C) dividing each pixel group into a plurality of n×n pixel blocks; D) processing each pixel of a pixel block with a transform function and storing a resulting transform coefficient value associated with each processed pixel in a two-dimensional array of elements, each element addressable with an index value: E) quantizing less than all of the transformation coefficient values in the two-dimensional array; F) scanning the quantized transformation coefficient values in a zig-zag pattern; G) determining the highest index value in the two-dimensional array having a non-zero coefficient value; H) designating a multiple of n that is greater than or equal to a highest index value as a group maximum index; I) transforming the two-dimensional array of addressable elements into a single dimension array of addressable elements; J) resizing the single dimension array into a number of addressable elements equal to the group maximum index; K) entropy encoding the non-zero quantized transformation coefficients; and L) forming a plurality of binary streams representing non-zero quantized transformation coefficients. In embodiments, the method further comprises M) performing an inverse process of each of the acts recited in K) to A), respectively, in order from K) to A), respectively, to decompress the compressed image data.

According to one aspect of the disclosure, a method of compressing image data comprises: A) converting a frame of image data into a plurality of color planes; B) dividing each plane into a plurality of uniform sized pixel blocks; C) processing each pixel of a pixel block with a transform function and storing a resulting transform coefficient value associated with each processed pixel in a two-dimensional array of elements, each element addressable with an index value; D) quantizing less than all of the transformation coefficient values in the two-dimensional array; E) scanning the quantized transformation coefficient values in a zig-zag pattern; F) compressing the quantized transform coefficient values of the pixel block in a manner which enables decoding of less than all of the quantized transform coefficient values, wherein no interest frame prediction is utilized for compression of the frame image data.

DETAILED DESCRIPTION

The present disclosure will be more completely understood through the following description, which should be read in conjunction with the drawings. In this description, like numbers refer to similar elements within various embodiments of the present disclosure. The skilled artisan will readily appreciate that the methods, apparatus and systems described herein are merely exemplary and that variations can be made without departing from the spirit and scope of the disclosure. The terms comprise, include, and/or plural forms of each are open ended and include the listed parts and can include additional parts that are not listed. The term and/or is open ended and includes one or more of the listed parts and combinations of the listed parts.

In the disclosed video codec only key image frames are processed to allow fast seeking and backward playback. Use of only uniform sized discrete cosine transformation blocks allows partial frame decoding, without using intraframe prediction, and allows easy playback at increased speeds and skips decoding of frames that are not displayed. The disclosed video codec may optionally support an alpha channel.

FIG. 1, illustrates conceptually a system 10 in which a compression process flow path 12 results in a compressed image 15 which is then decompressed by a decompression process flow path 14. The functional blocks in the compression process flow path 12 share data in quantization table 16 and count and size data table 18 with the functional blocks in the decompression process flow path 14, as illustrated. A number of Huffman encoder functional blocks 18 are utilized in the compression/decompression algorithm along with various bit streams. The functional processes used in the decompression process flow path 14 are the respective corresponding inverse functions of the functional processes used in the compression process flow path 12 for the compressed image 15. Data compressed data using methods and techniques described herein may be stored and/or transmitted to a device, such as a computer having a general purpose CPU and GPU for decompression and recreation of the original image data.

Figure 2A:
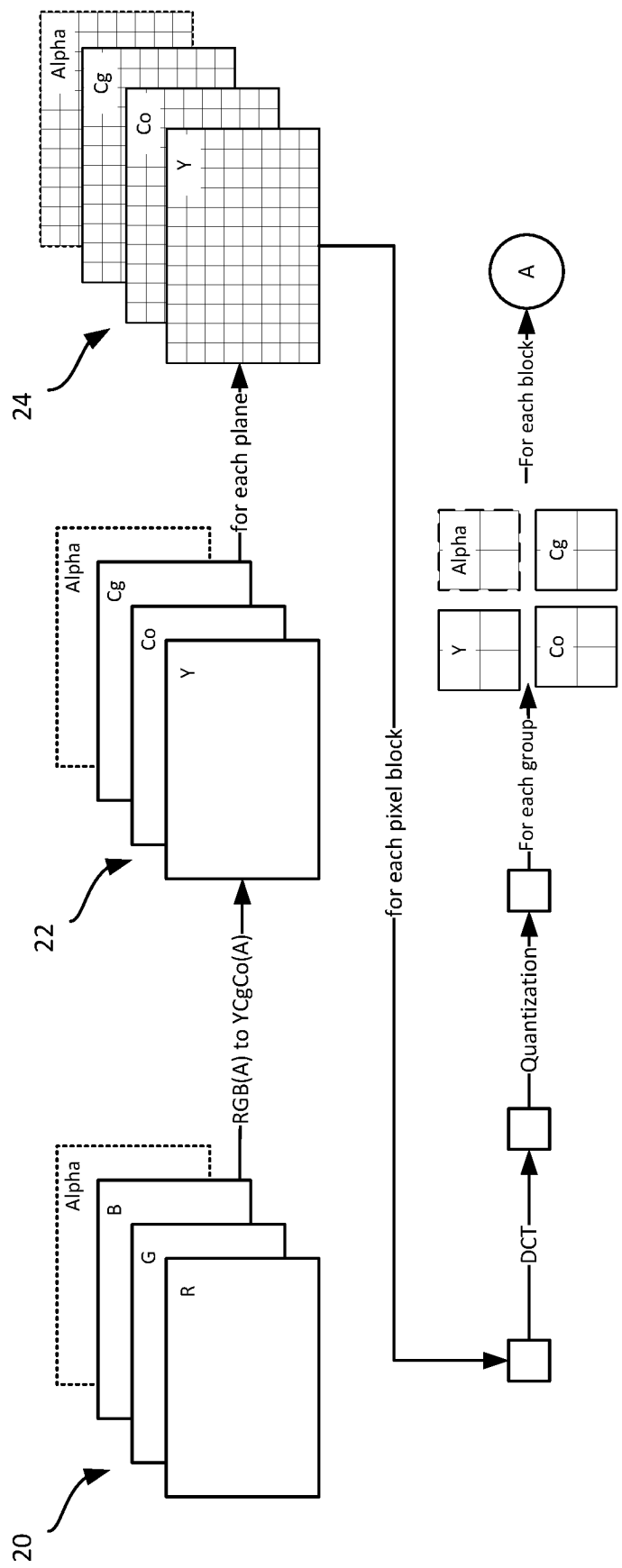
FIGS. 2A-B illustrates conceptually processing functions used to compress image data in accordance with the disclosure.

Referring to 2A-B, raw image data is converted into compressed data with a series of processing and reformatting functions, as described herein. Such compressed data is subsequently decompressed utilizing an inverse series of processing and formatting functions allowing an accurate regeneration of the original raw image data, as explained hereinafter in greater detail. Referring to FIG. 2A, raw image data, typically in a number of planes 20 comprising RGB color space, is first converted to number of planes 22 comprising YCoCg(A) color space. The YCoCg color model, also known as the YCgCo color model, is the color space formed from a simple transformation of an associated RGB color space into a luma value (denoted as Y) and two chroma values called chrominance green (Cg) and chrominance orange (Co). It is common to decorrelate the RGB fields into in YCgCo color model. The equations for such conversion are given below:

$Co = R - B$ $tmp = B + Co/2$ $Cg = G - tmp$ $Y = tmp + Cg/2$

Next, the planes 24 resulting from the conversion into YCoCg(A) color space are processed with a Discrete Cosine Transform (DCT) functional algorithm 25A which expresses a finite sequence of data points in terms of a sum of cosine functions oscillating at different frequencies. The DCT function 25A is a widely used transformation technique in signal processing and data compression. The most common variant of discrete cosine transform is the type-II DCT, often called simply "the DCT", is the most widely used transformation technique in signal processing, and the most widely used linear transform in data compression. DCT compression, also known as block compression, compresses data in sets of discrete DCT blocks. DCT blocks can have a number of sizes, including 8×8 pixels for the standard DCT, and varied integer DCT sizes between 4×4 and 32×32 pixels.

Figure 2B:
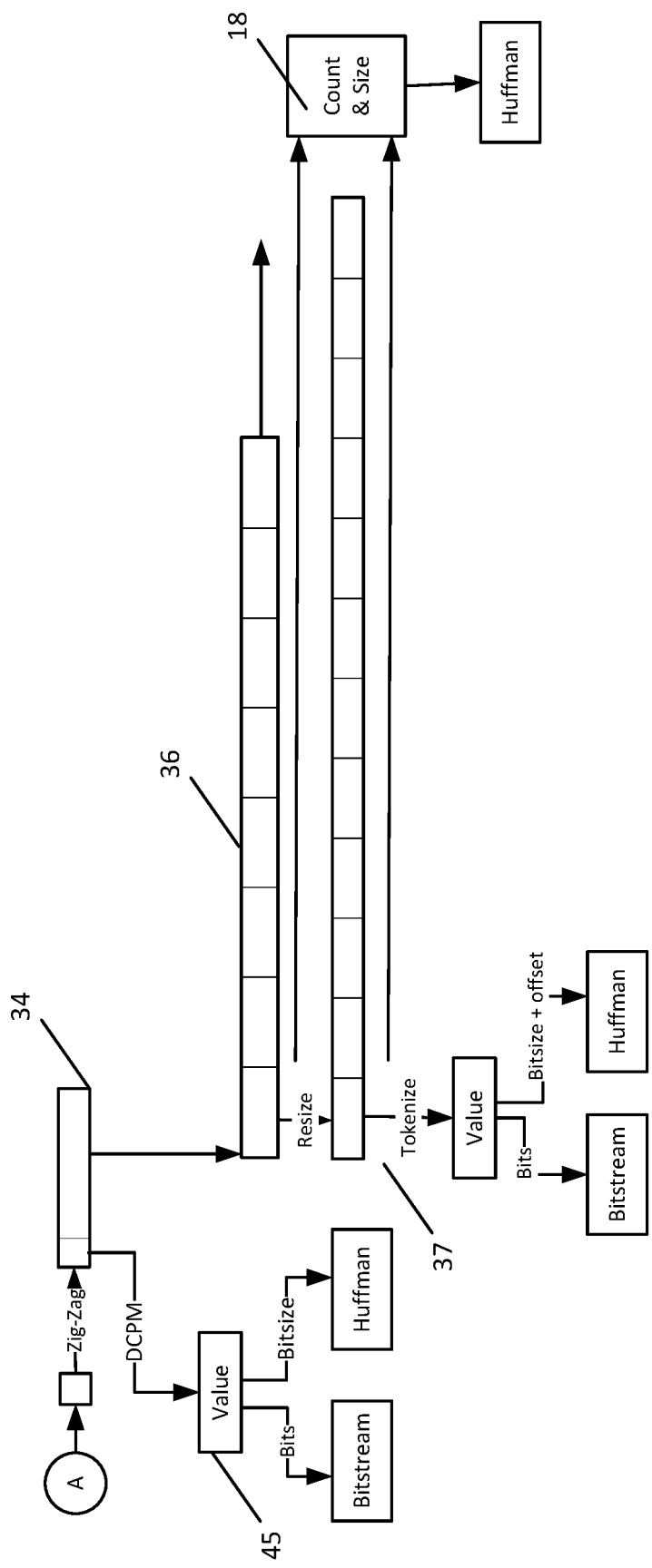
Figure 3:
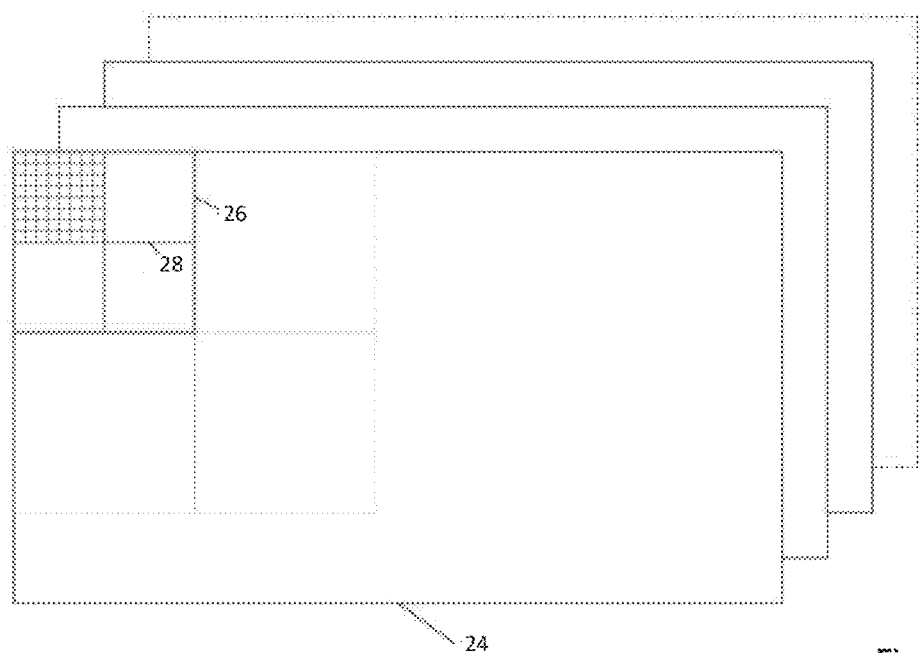
FIG. 3 illustrates conceptually a plurality of the planes representing an image frame, with each plane divided into a plurality of pixel groups and each pixel group further subdivided into a plurality of pixel blocks in accordance with the disclosure.

In embodiments, as illustrated in FIGS. 2A-B and 3, each color plane 24 is divided into multiple pixel groups 26 of 16×16 pixels each. Each pixel groups 26 is further subdivided into pixel blocks 28 of 8×8 pixels each, resulting in a two-dimensional array 30 with each pixel identifiable with an index from (0,0) to (7,7). Each pixel block 28 is processed with a Discrete Cosine Transform (DCT), resulting in an 8×8 transform coefficient array in which the (0,0) element (top-left) is the DC (zero-frequency) component and elements with increasing vertical and horizontal index values representing higher vertical and horizontal spatial frequencies. The values of each element in the coefficient array are then quantized with functional algorithm 27A, typically in conjunction with quantization table 16, and the quantized value stored as the new coefficient value in the corresponding array element.

Figure 4:
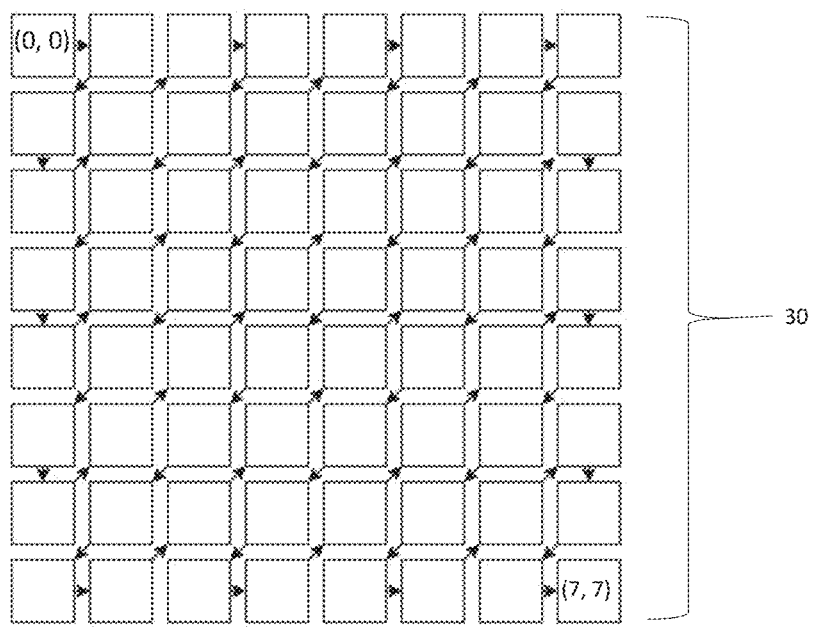
FIG. 4 illustrates conceptually a two-dimensional array representing a pixel block and the zigzag order in which the array elements are processed in accordance with the disclosure.
Figure 5:
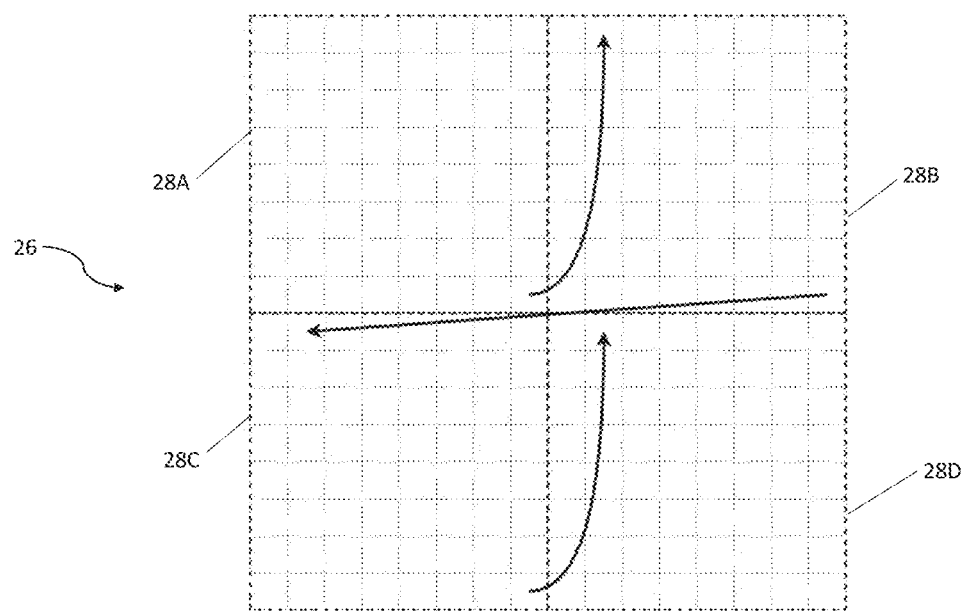
FIG. 5 illustrates conceptually a pixel group and the order in which the plurality of pixel blocks within the pixel group order are processed in accordance with the disclosure.
Figure 6:
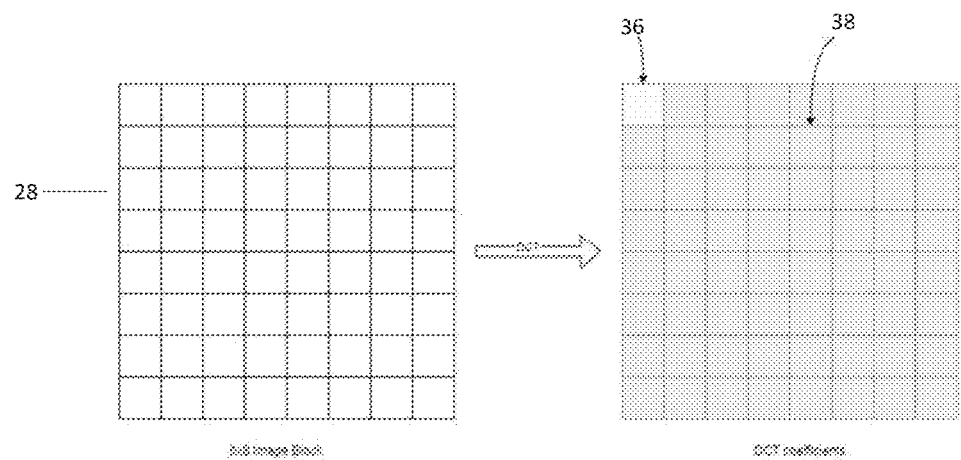
FIG. 6 illustrates conceptually a two-dimensional array of transformation coefficient values in accordance with the disclosure.

Next, the multiple pixel blocks 28 within a pixel group 26 are scanned in zigzag order, functional algorithm 29A skipping the DC coefficient value at index (0,0) of each pixel block, converting the two dimensional indices from (0,1) to (7,7) of each pixel block 28 into a one dimensional sequence array 34 from 1 to 63. FIG. 4 illustrates an order in which individual pixels within a pixel block 28 may be scanned from indices from (0,1) to (7,7). FIG. 5 illustrates an order in which the indices of multiple pixel blocks 28A-D within a pixel group 26 may be scanned from index (7,7) of pixel block 28A to index (0,1) of adjacent pixel block 28B and from index (7,7) of pixel block 28B to index (0,1) of adjacent pixel block 28C and from index (7,7) of pixel block 28C to index (0,1) of adjacent pixel block 28D. Scanning then continues to index (7,7) of pixel block 28D. FIG. 6 illustrates the coefficient at index position (0,0) of each pixel block 28, referred to as the DO coefficient 36, with the remaining coefficients at the other 63 indices from (0,1) to (7,7) referred to as the block AC coefficients 38, The maximum index of all non-zero coefficient values in a pixel group 26 is identified and converted to the Group Maximum Index 40 (GMI) by taking the smallest value from the table [8, 16, 32, 64] that is equal or bigger than the maximum index. The one dimensional sequence array 36 of each pixel block is then resized to match the size of the GMI, and all sequence arrays combined to form a single binary stream 42 suitable for encoding.

Figure 8A:
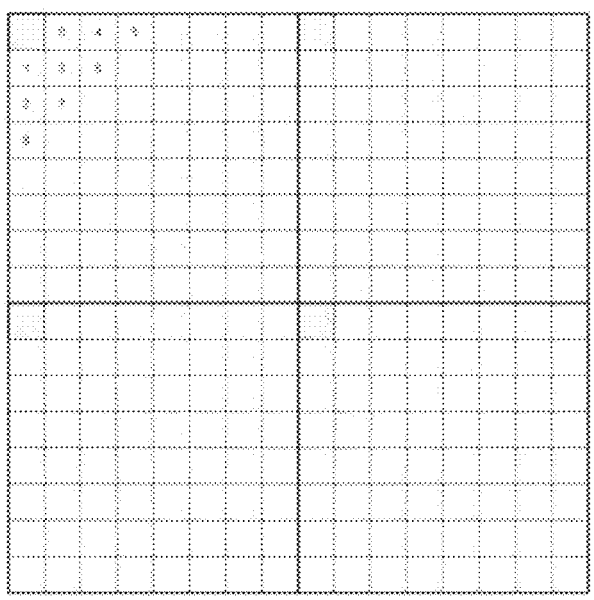
FIGS. 8A-B illustrate conceptually the transformation of a two-dimensional array of coefficient values into a binary stream in accordance with the disclosure.
Figure 8B:
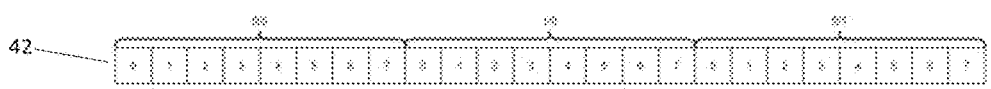

FIG. 8A illustrates an example of a group 44 with four pixel blocks per group, with 8×8 pixels per block. FIG. 8B illustrates a corresponding bitstream 42 with 8 bits allocated per coefficient. FIG. 2B illustrates a one dimensional sequence array 36 and its resized counterpart 37, with the additional values (shown in phantom) appended to an end thereof. In embodiments, the compressed data resulting from the decompression methods described herein comprises eight bit streams, interleaved at the 32 bit boundaries, and count and size data describing the bit streams 42 which has been tokenized by functional algorithm 33A and Huffman encoded.

Next, the quantized coefficient values are transformed for the entropy encoding of the non-zero coefficients. Entropy encoding is a lossless data compression scheme that is independent of the specific characteristics of the medium. In embodiment, the entropy encoding is implemented using Huffman encoding. Huffman coding uses a specific method for choosing the representation for each symbol, resulting in a prefix code (sometimes called "prefix-free codes") that is, the bit string representing some particular symbol is never a prefix of the bit string representing any other symbol.

Figure 7:
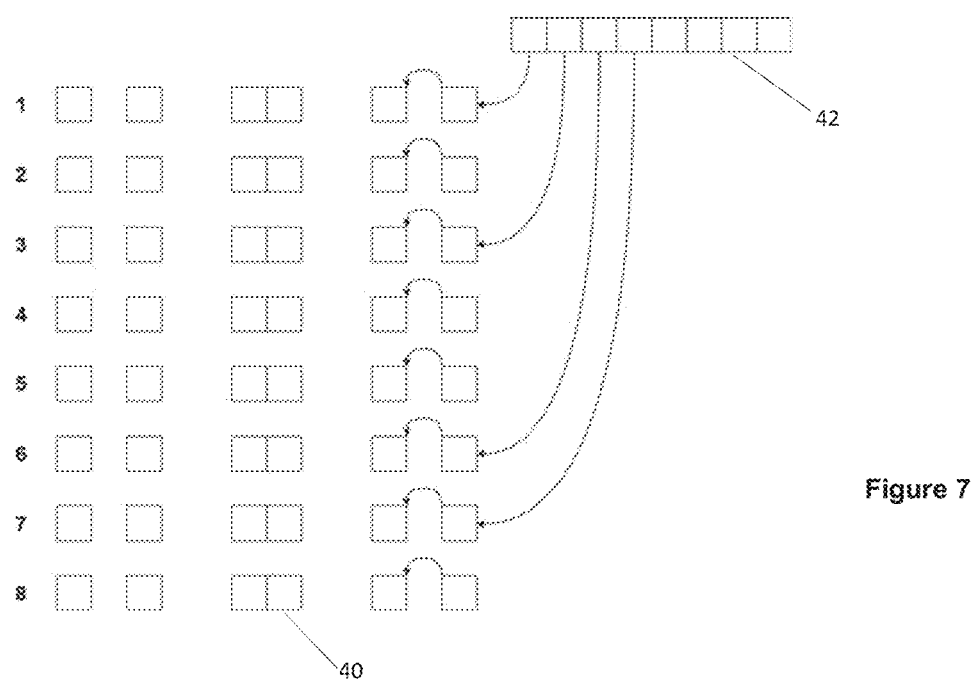
FIG. 7 illustrates conceptually various bit formats in accordance with the disclosure.

The quantized coefficient values are transformed for entropy encoding by first, taking the absolute value of each coefficient. Then the highest non-zero bit is calculated as the BT (bit count). The sign, the absolute value and the BT of each coefficient value are formed into bit streams, as illustrated in FIG. 2B, For the entropy encoding a Huffman encoder is used, The BT and the skip value (a value identifying the next n bits as all zero) are also Huffman encoded. The Group Maximum Index 40 for each pixel group is stored as two bit value per group, as illustrated in FIG. 7.

bits=coeff==0?0:(32−ciz(abs(coeff)))

value=((abs(coeff)<<1)|(coeff<0?1:0))&((1<<bits)−1)

The process of determining the number of bits to represent a particular block is illustrated in FIG. 2B. As illustrated in FIG. 2B, the coefficient array values are resized and tokenized and formed into eight bit streams with the resizing and token values, as illustrated in FIG. 2B, and Huffman encoded. The compressed data resulting from the decompression methods described herein comprises the eight bit streams, interleaved at the 32 bit boundaries, and count and size data describing the bit streams which has been to organized is Huffman encoded. The DCPM value 45 in the coefficient array value is described in terms of the number of bits in the bitstream and a bits size value which is Huffman encoded.

In embodiments, the separately stored DC coefficients are a downscaled version of the frame and can be used for very fast playback at reduced quality. This avoids processing most of the data from each frame and needs no IDCT at all.

FIGS. 9A and 9B illustrate an example of a four block per group, with 8×8 pixels per block. If the coefficients of the four blocks are as illustrated in FIG. 9A after DCT and quantization, the minimum size from the table that is bigger or equal to the maximum index of the none zero AC coefficient of all blocks is 8. The four blocks and their respective coefficient values will appear as set forth in FIG. 9B following zigzag scanning and resizing, e.g. the appending of zero values to create a uniform size stream and per pixel block. The Group Maximum Index 40 for each pixel group is stored as two bit value per group.

The process for tokening the data representing each coefficient value is described as follows. Given a ValueToken in the format of BBBBSSSS wherein BBBB is a four bit value of the used bits (1-15) whose values represent the following:

BBBB: 0000−>Used for SkipToken
BBBB: 0001−>1
BBBB: 0010−>2
BBBB: 0011−>3
BBBB: 0100−>4
BBBB: 0101−>5 and wherein SSSS is a four bit value of the index offset (1-16) whose values represent the following:

SSSS: 0000−>1
SSSS: 0001−>2
SSSS: 0010−>3
SSSS: 0011−>4
SSSS: 0100−>5
SSSS: 0101−>6 and given a SkipToken in the format of 0000SSSS wherein SSSS is a four bit value of the number of values to skip times 16 (16-256) whose values represent the following:
SSSS: 0000->16
SSSS: 0001->32
SSSS: 0010->48
SSSS: 0011->64

Therefore, the tokenization of the coefficient values in the array illustrated in FIG. 9B would be as follows:
(tokenCount<<3)|(groupSize)|(accelerationBit<<2)
coefficient: 4
bit count: 3
Bits: 000
Size+offset: 00110000
coefficient: −8
bit count: 4
Bits: 0001
Size+offset: 01000000
coefficient: 1
bit count: 1
Bits: 0
Size+offset: 00010000
coefficient: 0
count: 16
Bits: <nothing>
Size+offset: 00000001
coefficient: 1
bit count: 1
Bits: 0
Size+offset: 00010110
coefficient: −3
bit count: 2
Bits: 111
Size+offset: 00100000
token count: 6

The resulting token count and size are encoded and used to form the compressed data. In embodiments, eight interleaved binary streams are used to maximize parallel decoding and are provided to a general purpose CPU capable of performing SIMD processing for the initial decompression with partially decompressed data transferable a GPU to reduce the required transfer bandwidth and balances the workload of the system.

In accordance with another aspect of the disclosure, making an independent alpha value part of the codec is of great advantage for visual artists. Most general purpose video codecs don't support an alpha value. In a two dimensional image a color combination is stored for each picture element (pixel). Additional data for each pixel is stored in the alpha channel with a value ranging from 0 to 1. A value of 0 means that the pixel is fully transparent and does not provide any coverage information, i.e. there is no occlusion at the image pixel window because the geometry did not overlap this pixel. A value of 1 means that the pixel is fully opaque because the geometry completely overlaps the pixel window. With the existence of an alpha channel, it is possible to express compositing image operations using a compositing algebra. The alpha plane representing the alpha channel of the YCoCg color planes is processed similar to the other planes of the YCoCg(A) color model, as described herein.

An optional acceleration bit may be stored per pixel group and can be used to signal that all chroma coefficients of the fourth, fifth, sixth and seventh row of each pixel block in the pixel group are zero, or, that no alpha block has any non-zero coefficients besides the coefficient at (0,0). The optional acceleration bit is stored per pixel group together with the Group Size and Token Count, as illustrated in FIG. 7. The acceleration bit has a value of one when the whole group is opaque (no alpha plane being used or all alpha values in the four blocks representing opaque) and the coefficients of the fourth, fifth, sixth and seventh row of each chroma block in the group are zero. Else the acceleration bit has a value of zero.

Data Decompression

Data compressed data using methods and techniques described herein may be stored and/or transmitted to a device, such as a computer having a general purpose CPU and GPU for decompression and recreation of the original image data. As illustrated in FIG. 1, the compression data is provided to one or more Huffman decoders, one of which is used to retrieve the bit stream count and size data which is then used to inverse tokenize values from the bitstream and inverse tokenize, functional algorithm 33B, the data describing the coefficient array. Thereafter, an inverse exact scheme is done using functional algorithm 31B, 29B and 27B, for inverse resizing, inverse zig-zag scanning, and inverse quantization, respectively, and an inverse DCT function 25B performed to return the data to the YCoCg(A) color planes representing the reconstructed image data in decompressed form. The functional processes used for such decompression are the inverse of those described herein for compression of the same image data.

Embodiments of the above-described systems and methods can be implemented in digital electronic circuitry, in computer hardware, firmware, software and combinations thereof. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program is provided in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site, The disclosed method steps can be performed by one or more programmable processors executing a computer program to perform the described functionality by operating on input data and generating output. Method steps can also be performed by and an apparatus can be implemented as special purpose logic circuitry. The circuitry can, for example, be a FPGA (field programmable gate array) and/or an ASIC (application specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both, The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device, The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier Internet protocol (IP) network (e.g., local area network (LAN), wide area network (WAN), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

In addition, any one or more of the functions described herein can be performed on a single computer or multiple computers operatively at work together over public or private network infrastructure's. Similarly, any particular piece of data may be stored anywhere over a network infrastructure which is accessible by other routines or applications within the disclosed system.

The transmitting device can include, for example, a computer, a computer with a browser device, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation, etrc.). The mobile computing device includes, for example, a smartphone or tablet (e.g., iPhone®, iPad®, Android® device, etc.).

The reader can appreciate that the disclosed video codec does not utilize intra frame prediction. The disclosed technique utilizes uniform sized discrete cosine transformation blocks, thereby allowing partial decoding of a frame. Using no prediction based on decoded pixels also allows greater freedom for the decoder. Decoding errors don't accumulate between blocks or frames, avoiding the need for bit exact decoding and making it possible to use faster implementation on general purpose accelerators. Those features combined also allow cutting the video frame into different areas without degrading quality. No quality degrading decompression and compression is needed when cutting out an area of the movie. The disclosed video reduces the control logic resources and is readily adapted to processing hardware having general purpose accelerators like graphic processing units.

The foregoing description has been presented for purposes of illustration, It is not exhaustive and is not limited to the precise forms or embodiments disclosed, Modifications and adaptations will be apparent to those skilled in the art from consideration of the specification and practice of the disclosed embodiments.

At various places in the present specification, values are disclosed in groups or in ranges. It is specifically intended that the description include each and every individual sub-combination of the members of such groups and ranges and any combination of the various endpoints of such groups or ranges. For example, an integer in the range of 0 to 40 is specifically intended to individually disclose 0, 1, 2, 3, 4, 5, 6, 7, 8, 9, 10, 11, 12, 13, 14, 15, 16, 17, 18, 19, 20, 21, 22, 23. 24, 25, 26, 27, 28, 29, 30, 31, 32, 33, 34, 35, 36, 37, 38, 39, and 40, and an integer in the range of 1 to 20 is specifically intended to individually disclose 1, 2, 3, 4, 5, 6, 7, 8, 9, 10, 11, 12, 13, 14, 15, 16, 17, 18, 19, and 20. Real numbers are intended to be similarly inclusive, including values up to at least three decimal places.

As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and, accordingly, all suitable modifications and equivalents falling within the scope of the disclosure may be resorted to.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Moreover, while illustrative embodiments have been described herein, the scope of any and all embodiments include equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A method of compressing image data comprising:
A) converting image data into a plurality of color planes,
B) dividing each plane into a plurality of pixel groups,
C) dividing each pixel group into a plurality of n×n pixel blocks,
D) processing each pixel of a pixel block with a transform function and storing a resulting transform coefficient value associated with each processed pixel in a two-dimensional array of elements, each element addressable with an index value,
E) quantizing less than all of the transformation coefficient values in the two-dimensional array,
F) scanning the quantized transformation coefficient values in a zig-zag pattern,
G) determining the highest index value in the two-dimensional array having a non-zero coefficient value,
H) designating a multiple of n that is greater than or equal to a highest index value as a group maximum index,
I) transforming the two-dimensional array of addressable elements into a single dimension array of addressable elements,
J) resizing the single dimension array into a number of addressable elements equal to the group maximum index,
K) entropy encoding non-zero quantized transformation coefficients; and
L) a forming a plurality of binary streams representing non-zero quantized transformation coefficients.

2. The method of claim 1 wherein n is an integer power two.

3. The method of claim 1 wherein L) comprises:
L1) forming eight binary streams representing non-zero quantized transformation coefficients.

4. The method of claim 1 wherein A) comprises:
A1) converting image data into a plurality of color planes in accordance with the YCoCg color space.

5. The method of claim 1 wherein A) comprises:
A1) converting image data into a plurality of color planes in accordance with the YCoCg(A) color space.

6. The method of claim 1 wherein D) comprises:
D1) processing each pixel of a pixel block with a discrete cosine transform function.

7. The method of claim 1 wherein E) comprises:
E1) quantizing all but one of the transformation coefficient values in the two-dimensional array.

8. The method of claim 1 wherein K) comprises:
K1) entropy encoding the non-zero quantized transformation coefficients with a Huffman encoder function.

9. The method of claim 1 wherein K) comprises:
K1) determining the absolute value of each coefficient,
K2) determining the arithmetic sign of each coefficient, and
K3) determining the number of beds necessary to represent the coefficient value.

10. The method of claim 1 further comprising:
M) performing an inverse process of each of the acts recited in K) to A), respectively, in order from K) to A), respectively, to decompress the compressed image data.

11. A method of compressing image data comprising:
A) converting a frame of image data into a plurality of color planes,
B) dividing each plane into a plurality of uniform sized pixel blocks,
C) processing each pixel of a pixel block with a transform function and storing a resulting transform coefficient value associated with each processed pixel in a two-dimensional array of elements, each element addressable with an index value,
D) quantizing less than all of the transformation coefficient values in the two-dimensional array,
E) scanning the quantized transformation coefficient values in a zig-zag pattern,
F) compressing the quantized transform coefficient values of the pixel block in a manner which enables decoding of less than all of the quantized transform coefficient values, wherein no interim frame prediction is utilized for compression of the frame image data.

12. The method of claim 11 further comprising:
G) resizing the single dimension array into a number of addressable elements equal to the group maximum index.

13. The method of claim 12 further comprising:
H) entropy encoding the non-zero quantized transformation coefficients.

14. The method of claim 13 further comprising:
I) a forming a plurality of binary streams representing non-zero quantized transformation coefficients.

15. The method of claim 14 wherein A) comprises:
A1) converting image data into a plurality of color planes in accordance with the YCoCg color space.

16. The method of claim 1 wherein C) comprises:
C1) processing each pixel of a pixel block with a discrete cosine transform function.

17. The method of claim 1 wherein D) comprises:
D1) quantizing all but one of the transformation coefficient values in the two-dimensional array.

18. The method of claim 11 wherein F) comprises:
F1) entropy encoding the non-zero quantized transformation coefficients with a Huffman encoder function.

* * * * *